United States Patent [19]

Zacharia et al.

[11] Patent Number: 6,018,729
[45] Date of Patent: Jan. 25, 2000

[54] NEURAL NETWORK CONTROL OF SPOT WELDING

[75] Inventors: Thomas Zacharia; John D. Allen, Jr., both of Knoxville, Tenn.; James G. Schroth, Troy, Mich.

[73] Assignees: Lockheed Martin Energy Research Corporation, Oak Ridge, Tenn.; General Motors Corporation, Detroit, Mich.

[21] Appl. No.: 08/932,439

[22] Filed: Sep. 17, 1997

[51] Int. Cl.[7] .............................. G06E 1/00; G06E 3/00; G06F 15/18; G06G 7/00
[52] U.S. Cl. ................................ 706/21; 706/20; 706/23; 219/110; 219/117.1; 219/121.64; 219/130.01
[58] Field of Search .................................. 706/21, 20, 23; 219/117, 110, 130, 121

[56] References Cited

U.S. PATENT DOCUMENTS

| | | | |
|---|---|---|---|
| 4,387,289 | 6/1983 | Nakata et al. | 219/110 |
| 4,434,351 | 2/1984 | Nakata et al. | 219/117.1 |
| 4,503,312 | 3/1985 | Nakata et al. | 219/117.1 |
| 5,015,815 | 5/1991 | Matuschek et al. | 219/110 |
| 5,258,903 | 11/1993 | Rodriguez-Cavazos | 363/21 |
| 5,283,418 | 2/1994 | Bellows et al. | 219/130.01 |
| 5,286,947 | 2/1994 | Clyde et al. | 219/121.83 |
| 5,291,390 | 3/1994 | Satou | 364/148 |
| 5,306,893 | 4/1994 | Morris et al. | 219/130.01 |
| 5,361,213 | 11/1994 | Fujieda et al. | 364/431.08 |
| 5,380,978 | 1/1995 | Pryor | 219/121.64 |
| 5,396,415 | 3/1995 | Konar et al. | 364/162 |
| 5,510,596 | 4/1996 | Xu et al. | 219/130.01 |
| 5,674,415 | 10/1997 | Leong et al. | 219/121.83 |
| 5,764,859 | 6/1998 | Kim et al. | 706/20 |
| 5,796,922 | 8/1998 | Smith | 706/23 |

OTHER PUBLICATIONS

Messler, R.W., et al., An Intelligent Control System for Resistance Spot Welding Using aNeural Network and Fuzzy Logic, Industry Applications Conference, 1995. Thirteenth IAS Annual Meeting, IAS '95., Conference record of the 1995 IEEE Volume: 2 page(s): Jan. 1995.

*Primary Examiner*—Tariq R. Hafiz
*Assistant Examiner*—Wilbert L. Starks, Jr.
*Attorney, Agent, or Firm*—Quarles & Brady LLP

[57] ABSTRACT

A spot welder comprises a neural network for processing, in real time, current and voltage energizing a weld in progress. The neural network generates a predicted time of optimal weld strength and/or nugget size for the weld in progress. A controller terminates the weld in progress at the predicted time. A method for controlling a spot welder comprises the steps of: sensing in real time current and voltage energizing a spot weld in progress; predicting a time of optimal weld strength and/or nugget size with a neural network responsive to the sensed current and voltage; and, terminating the weld in progress at the predicted time. A sensor for electromotive forces (EMF) induced by the spot welder can generate a signal for canceling out a large fraction of EMF components in at least one or both of the current and voltage signals. EMF components are substantially precluded in the current signal if the current sensor uses a buried shunt. Termination of the weld in progress at the predicted time is prevented when the predicted time precedes a predetermined minimum weld duration. The weld in progress is terminated at a predetermined maximum weld duration when the predicted time is after the predetermined maximum weld duration.

22 Claims, 6 Drawing Sheets

NEURAL NETWORK CONTROL OF SPOT WELDING

FIELD OF THE INVENTION

This invention relates to the field of spot welders and, more particularly, to production spot welders utilizing a neural network to control welding time and to control welding current as a function of time, thereby optimizing spot welding conditions and spot weld strength.

DESCRIPTION OF RELATED ART

Spot welding is a convenient and effective method of joining two or more metal layers face-to-face in a stack-up. A spot weld is produced by a pair of opposing electrode tips brought toward each other so as to clamp the stack-up of material between them. It is not unusual that the stack-up can include several sheets of material and that these several sheets do not fit together snugly before they are attached one to another. Accordingly, the clamping pressure exerted on the stack-up by the electrodes and, more particularly, by the tips of the electrodes can be quite high.

A current, for example between 5,000 and 20,000 amperes, the exact current being dependent upon a number of different factors, is conducted between the electrodes and through the stack-up. The current flow through the inherent resistance of the stack-up produces heat. The heat causes the material to soften and melt. The fused material between the electrodes is called a nugget.

As the weld progresses, the nugget continues to grow in size. At some instant, due to the continued growth of the nugget and the constant pressure of the electrode tips on the stack-up, the fluid material of the nugget is expelled from the nugget site between the electrode tips, flowing out between the sheets of the stack-up. This event is termed weld expulsion.

Weld expulsion should be avoided because although acceptable welds can be made with expulsion, under that condition weld tip life is reduced and weld quality is more variable than when weld expulsion is avoided. Good weld strength can be reproducibly achieved at an instant just prior to such expulsion. It is at this time, that is, just prior to expulsion, that the material of the sheets has fused together as much as possible without being spread through the stack-up. Developing the nugget to just this extent ensures the greatest amount of bonding between the sheets, which each contribute material to the nugget. However, after expulsion, the thickness of the nugget is reduced, producing a weaker weld.

Another benefit of spot welding is that it lends itself well to automated positioning of the welding apparatus. Spot welders on multi-axis robot arms can quickly deliver a weld in awkward locations that are difficult to reach manually.

The problem with automating the spot welding process is that it is characterized by so many difficult to control variables. Variables such as electrode tip condition, tip angle, tip force, and tip alignment, as well as stack-up material type, thickness, surface area, surface condition, and surface cladding all affect the applied current time required for the production of an optimal weld. Thus, these variables must be closely controlled to produce a good spot weld by merely applying current for a fixed or predetermined length of time.

Experimental control methods, other than merely timing the weld duration, have been used in an effort to overcome this problem. Some controllers measure a quantity related to or representative of the resistance exhibited by the stack-up as a function of weld time, because direct measurement is impractical. At expulsion, the resistance as measured through the electrodes reduces appreciably. In principal, when this event is detected, the controller could stop the current from the power supply and terminate the weld. However, at this instant, weld expulsion has already started, and even though current could be quickly cut before the expulsion proceeds to such an extent as to render the weld worthless, the earlier instant at which the optimal weld could have been produced has passed. As a result, weld strength is compromised.

Manufacturers are aware of deficiencies of controllers and accordingly manufacturers typically place some redundant welds, just in case a smaller number of the welds does not provide enough strength to hold the stack-up together under anticipated loads. This redundancy costs money, not only in terms of the extra time required for the welding process, but also in the cost of replacing worn components of the spot welder at a greatly increased frequency. Examples of worn components which are often replaced too frequently include electrodes, electrode tips, and cabling.

What is needed, therefore, is a spot welding apparatus that can terminate a spot weld in progress at the precise moment at which optimal weld strength and/or nugget size is achieved, both weld strength and nugget size being useful criteria for determining the quality of a spot weld.

Neural networks have been used in the control circuits of power supplies for television receivers, as taught in U.S. Pat. No. 5,258,903. Neural networks have never been used in conjunction with spot welding apparatus or methods for spot welding.

SUMMARY OF THE INVENTION

Much of what contributes to the physical evolution of a spot welding event can be inferred from the temporal history of a quantity usually referred to as the dynamic weld resistance. If a neural network, or, for that matter, any other scheme, is to draw proper conclusions about the characteristics of a weld in process, it is imperative that an accurate determination of the sequence of values for this parameter be made. Although it may seem straightforward to measure both the voltage drop appearing at the opposing faces of a stack-up for a weld in process and the corresponding current flowing in the welding circuit, such measurements are fraught with difficulty when alternating currents of tens of kilo amperes are involved. Nevertheless, if due regard is taken for the influences of induced electromotive forces (EMF), it is not unreasonable, at least in a laboratory setting for example, to attach sensing leads directly to the welding electrodes themselves for measuring voltage drop and to measure welding current by determining the voltage drop across a known and very small resistance placed in series with the welding circuit. However, in an industrial setting it is inconvenient, if not impossible, to arrange for leads to be attached directly to the weld electrodes themselves.

One alternative to the direct measurement of dynamic resistance is an indirect scheme wherein the dynamic weld resistance is inferred from two or more parameters whose measurements can be made remotely and without either intrusion into the weld region or undue penalty in terms of increased maintenance costs. The principal difficulty associated with such an indirect resistance measuring scheme arises in connection with determination of the functional relationship linking the values of the remotely measured parameters and those of the desired resistance.

In accordance with the inventive arrangements, a neural network can be employed not only for the task of weld termination prediction, but for the task of learning to infer resistance values from the values of parameters whose measurement would be tolerated in an industrial setting. Once trained, a neural network is capable of computing the required and otherwise inaccessible resistance values from the accessible values of the input parameters without further reference to the voltage and current values obtaining at the weld tips.

Three parameters whose values can be employed in this first remote resistance determination method are: 1) the current in the secondary welding circuit, as determined from the voltage drop across a known resistance, for example, a buried shunt, (comprising, for example, the separated ends of twisted pair, two-conductor, cable inserted so as to lie axially within the strands of one of the welding cables and clamped in place to ensure reliable electrical contact); 2) the voltage appearing across the welding transformer secondary, as measured at the transformer terminals; and, 3) the voltage induced in a sense coil located within the physical welding secondary loop, but far removed from the welding electrodes themselves.

Such a solution is satisfactory in many circumstances, but much data acquisition equipment is required for its realization. Moreover, the solution relies too heavily upon an assumed stability in the welding equipment for assured reliable operation. Small changes in the operating conditions or in the mechanical configuration of the welding apparatus itself could produce substantial and uncorrectable changes in the values of the network determined resistance relationship and lead thereby to erroneous process control signals.

A second solution is based upon the realization that only consistent resistance values, not necessarily accurate values, are required for proper predictive functioning of the neural network. These can be obtained under a scheme which at the same time would reduce by one the number of data acquisition channels required and eliminate overloading problems certain to plague sensitive electronics operating in the intense electromagnetic environment of a functioning spot welder. Advantageously, the inventive arrangements make more effective use of the signals that are easiest to acquire. Thus, rather than use the sense coil signals as inputs to a resistance calculating network, a sense coil can be employed to generate a bucking EMF by which to cancel a large fraction of the induced EMF in the signal that would represent the voltage appearing directly at the welding transformer secondary, rather than at points nearer the welding electrodes themselves. Proper choice of sense coil position and orientation can be employed to provide a combination of signals whose net characteristics track very closely those of the desired signal which cannot be directly monitored, namely those representative of the dynamic weld resistance. In accordance with this inventive arrangement, it is possible to generate dynamic weld resistance curves very similar to those obtained using the laboratory arrangement, that is, by measurements at the weld tips. This solution provides very great reliability in predicting dynamic weld resistance.

A spot welder, an improved spot welder control and a method for spot welding, in accordance with an inventive arrangement and as taught herein, utilize a neural network to monitor operating parameters of a weld in progress. The neural network accurately predicts the precise instant at which optimal weld strength and/or nugget size would be achieved, based on the monitored parameters and based on training performed in the context of previous welds of similar type. Welding is terminated in accordance with the predicted instant.

Moreover, and in accordance with another inventive arrangement, the input information representing the sensed parameters and supplied to the neural network is conditioned and corrected to compensate for EMF otherwise distorting the sensed parameters. The number of parameters which must be processed by the neural network is thus reduced and the reliability of the neural network predictions is enhanced.

It is recognized, particularly in an automated environment, that grossly inaccurate weld times predicted by the neural network can occur unexpectedly. Such inaccuracy can result, for example, from unexpected component failure in the sensing or control system, from erratic operation of the power supply, from aberrant conditions at the weld site, or from an unexpected miscalculation by the neural network. Advantageously, and in accordance with yet another inventive arrangement, the termination of welding can be restricted to a range of times between predetermined minimum and maximum weld times, in order to prevent reliance on a predicted weld time which is, for any reason, outside that range. Predicted weld times outside such a range are herein deemed to be grossly inaccurate.

A spot welder which can terminate a spot weld in progress at the precise moment that optimal weld strength and/or nugget size is achieved, in accordance with an inventive arrangement, comprises: at least two electrodes having tips engageable with a stack-up of material; a power supply for energizing the electrodes to spot weld the stack-up when the electrodes are engaged with the stack-up; a current sensor coupled to the power supply and generating a signal representative of current supplied to the electrodes; a voltage sensor coupled to the power supply and generating a signal representative of voltage across the electrodes and the stack-up; a neural network for processing, in real time, data representative of the current and voltage signals for a weld in progress according to weights determined by previously processed current and voltage signal data, the neural network generating a predicted completion time for optimal weld strength and/or nugget size for the weld in progress; and, a controller responsive to the neural network for terminating the weld in progress responsive to the predicted completion time for optimal weld strength and/or nugget size.

In accordance with another inventive arrangement, the spot welder can further comprise a third sensor for detecting EMF induced by the spot welder and generating a third signal for substantially canceling out EMF components in at least one or both of the first and second signals.

Advantageously, the neural network can also be utilized during the welding process to control the welding current as a function of time.

In a presently preferred embodiment, the controller can further comprise: an analog-to-digital converter (ADC) for the current and voltage signals; a digital signal processor (DSP) for filtering and amplifying digital signals from the ADC for use by the neural network; a neural network controller for generating a stop current signal at the predicted time of optimal weld strength and/or nugget size; a welder controller responsive to the stop current signal for generating a digital stop current command; and, a digital-to-analog converter (DAC) responsive to the digital stop current command for supplying an analog stop current command to the power supply.

In one alternative, the controller further comprises a host programmed with set-up instructions for the ADC, the DSP, the neural network controller, the welder controller, and the DAC. In another alternative, the host receives the set-up instructions from a production control system.

In order to prevent a grossly inaccurate predicted time from causing a defective weld, the controller is advantageously programmed with a minimum weld time and a maximum weld time. The minimum weld time represents a minimum length of time after weld initiation before the controller terminates the weld in progress. The maximum weld time represents a maximum length of time after weld initiation before the controller terminates the weld. The controller is responsive to the predicted time of optimal weld strength and/or nugget size only between the minimum and maximum weld times. It should be noted that even if the equipment and control system are operating perfectly, conditions at the weld site may be so aberrant that no possibility exists for success.

The spot welder can also further comprise a robot arm for positioning the electrodes responsive to the controller.

An improved spot welder controller, having current and voltage sensors, which can terminate a spot weld in progress at the precise moment that optimal weld strength and/or nugget size is achieved, and in accordance with still another inventive arrangement, comprises: a neural network for processing, in real time, data representative of current and voltage signals from the current and voltage sensors for a weld in progress according to weights determined by previously processed current and voltage signal data, the neural network generating a predicted time of optimal weld strength and/or nugget size for the weld in progress; and, a controller responsive to the neural network for terminating the weld in progress responsive to the predicted time of optimal weld strength and/or nugget size.

Advantageously, the improved controller can further comprise a further sensor for EMF induced by the spot welder and generating a further signal for substantially canceling out EMF components in at least one or both of the respective signals.

In order to prevent a grossly inaccurate predicted time from causing a defective weld, the neural network controller is advantageously programmed with a minimum weld time and a maximum weld time. The minimum weld time represents a minimum length of time after weld initiation before the controller terminates the weld in progress. The maximum weld time represents a maximum length of time after weld initiation before the controller terminates the weld. The neural network controller is responsive to the predicted time of optimal weld strength and/or nugget size only between the minimum and maximum weld times.

A method for controlling a spot welder, which terminates a spot weld in progress at the precise moment that optimal weld strength and/or nugget size is achieved, in accordance with yet another inventive arrangement, comprises the steps of: sensing in real time current and voltage levels energizing a spot weld in progress; predicting a time of optimal weld strength and/or nugget size with a neural network responsive to the sensed current and voltage levels according to weights determined by previously processed current and voltage signal levels; and, terminating the weld in progress responsive to the predicted time of optimal weld strength and/or nugget size.

Advantageously, the method can further comprise the steps of: sensing in real time EMF induced by the spot welder; and, substantially canceling out EMF components in at least one or both of the sensed current and voltage levels in accordance with the sensed EMF prior to processing of the current and voltage levels by the neural network.

In order to prevent a grossly inaccurate predicted time from causing a defective weld, the method advantageously comprises the further steps of: preventing termination of the weld in progress responsive to the predicted time when the predicted time is prior to a predetermined minimum weld duration; and, terminating the weld in progress after a predetermined maximum weld duration when the predicted time is after the predetermined maximum weld duration.

BRIEF DESCRIPTION OF THE DRAWINGS

The inventive arrangements are shown in the drawings in forms which are presently preferred, it being understood, however, that the inventive arrangements are not limited to the precise arrangements and instrumentalities shown.

DETAILED DESCRIPTION OF THE PREFERRED EMBODIMENTS

Figure 1:
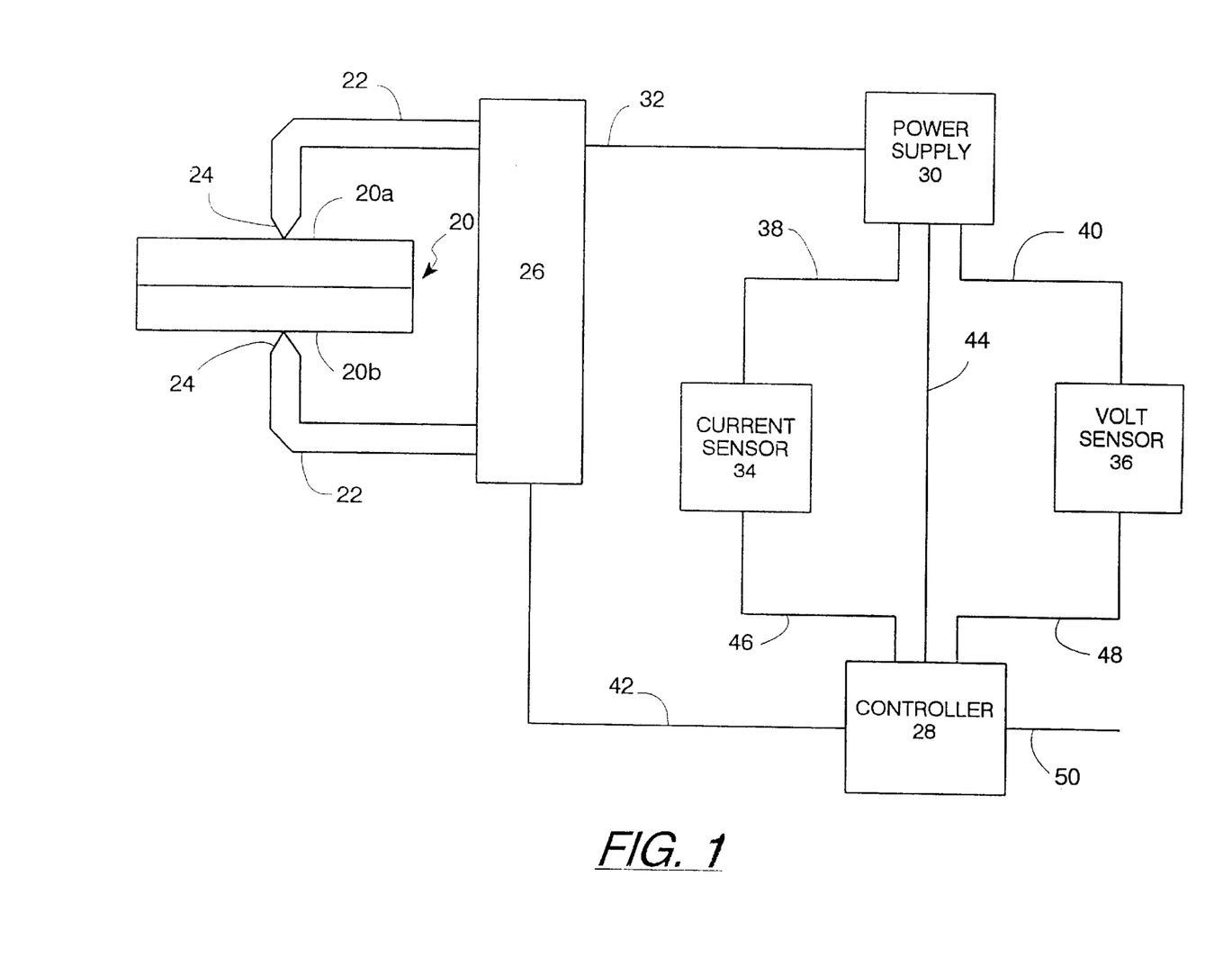
FIG. 1 is a block diagram of a spot welder controlled by a neural network, in accordance with the inventive arrangements.

Referring now to the drawings in which like reference characters designate like or corresponding parts throughout the several views, there is shown in FIG. 1 a first embodiment of a spot welding apparatus according to the inventive arrangements.

A stack-up 20 of material, including at least a top sheet 20a and a bottom sheet 20b, is presented to receive a spot weld. The stack-up 20 may be, for example, the sheet metal of an automobile body component. In welding cars, as in other applications, it is not unusual to weld more than just two sheets of material together, and the sheets must be clamped under pressure between the electrodes 22.

Current for the weld is delivered to the stack-up by the electrodes 22. Each electrode 22 has a tip 24. The tip 24 is the part of the electrode 22 which contacts the sheets 20a and 20b of the stack-up 20. The electrodes 22 are connected to a welding head 26. In the simplest embodiment, the welding head 26 is a hand directed device that provides a manual means of bringing the electrode tips 24 toward each other, pressing the sheets 20a and 20b between them. In the presently preferred embodiment, the welding head 26 is an automated device, under control of a computerized controller 28.

In various embodiments the welding head 26 is pneumatically, hydraulically, or electrically actuated, and disposed on a multi-axis robot arm. In such embodiments, the welding head 26 is automatically positioned, and delivers welds in locations that are difficult to reach by human operators, and at a speed that is much greater than is realized manually.

A power supply 30 provides current to the welding head 26. In the presently preferred embodiment, the power supply 30 can deliver about 20,000 amperes of current. The power supply 30 is connected to the welding head 26 by power cables 32. A current sensor 34 and a voltage sensor 36 are coupled between power supply 30 and welding head 26, indicated via the connections to line 32. Current sensor 34 senses via line 38 the current delivered by the power supply 30 to the welding head 26. The voltage sensor 36 senses via line 40 a voltage which is representative of the voltage across the power cables 32, electrodes 22, and stack-up 20. Due to resistive losses, the actual voltages are not directly measured.

It will be appreciated that references herein to the term line are intended to include, without limitation, single element conductors, multi-element conductors and conductors on which multiplexed signals can be transmitted, as may be most appropriate for the nature of the signals being transmitted or the intended use of the line.

The controller 28 is connected to the welding head 26 by line 42, to the power supply 30 by line 44, to the current sensor 34 by line 46, and to the voltage sensor 36 by line 48. In the presently preferred embodiment, the controller 28 is also connected by line 50 to a production control system responsible for coordinating the operation of many welding systems and other production equipment.

The current sensor 34 produces signals representative of the current supplied by the power supply 30, for example a voltage proportional to the current. The current-representative signals are coupled by line 46 to the controller 28, so that the controller 28 at all times receives information representative of the amount of current flowing from the power supply 30 to the welding head 26.

The voltage sensor 36 produces signals representative of the output voltage generated by the power supply 30, for example a proportion of the output voltage across the electrodes 22. The voltage measured is most nearly that at the electrodes 22 since these are attached to the transformer secondary terminals. The voltage-representative signals are coupled by line 48 to the controller 28, so that the controller 28 at all times receives information representative of the voltage across the electrodes 22.

The controller 28 positions the welding head 26 by sending control signals on line 42. When the welding head 26 is properly positioned, the controller 28 sends a start command on line 44 to the power supply 30, which initiates the current from the power supply 30 to the welding head 26. As described above, the controller 28 receives current and voltage signals from the current sensor 34 and the voltage sensor 36 as the weld progresses.

At a moment when there is a determination by the controller 28 that the optimal weld is achieved, the controller 28 sends a stop command on line 44 to the power supply 30, which causes the power supply 30 to terminate the current to the welding head 26. At this point the weld is completed. The controller 28 can then direct the welding head 26 to reposition the electrodes 22 at a new location, and initiate a subsequent weld.

Figure 2:
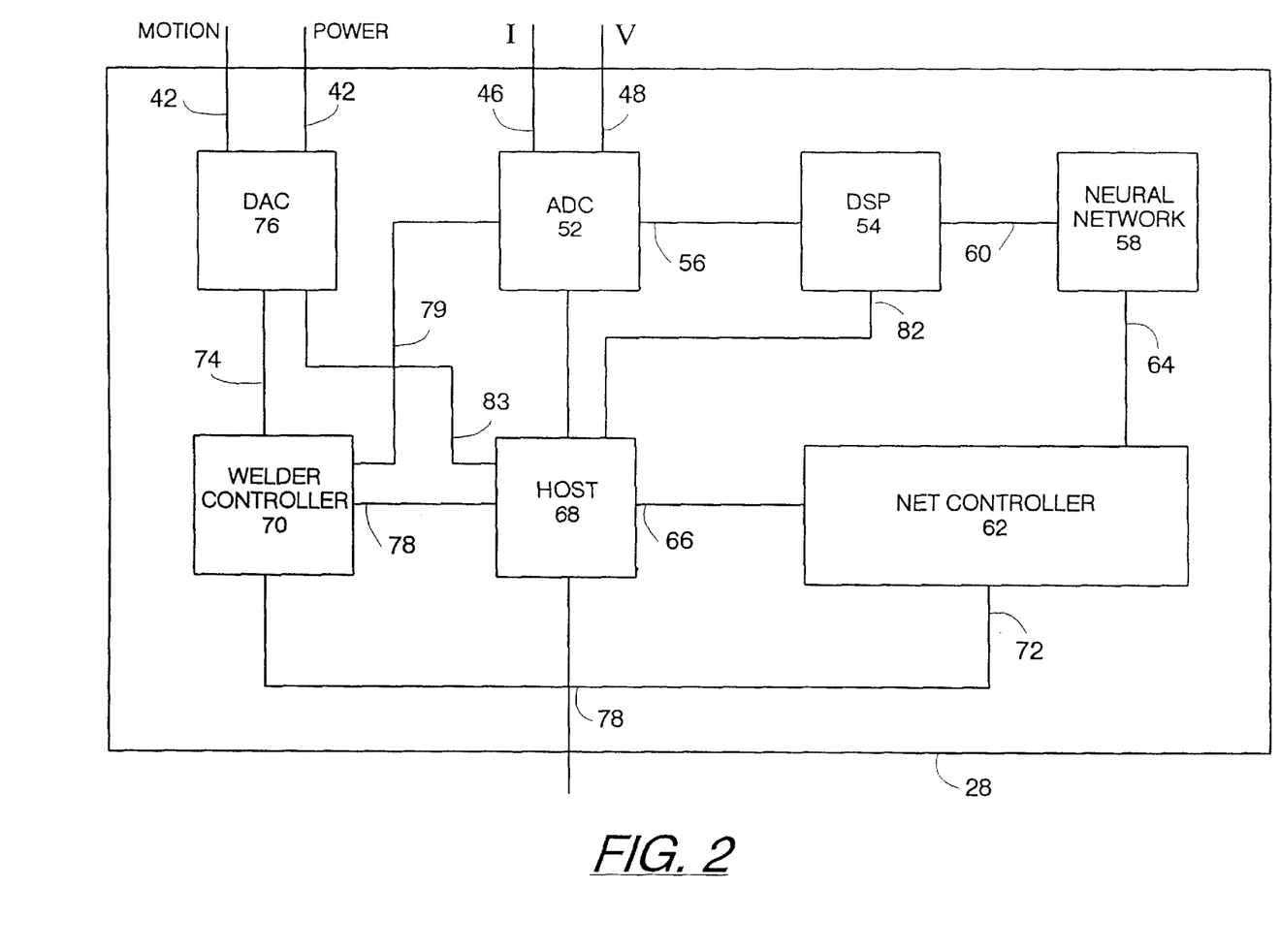
FIG. 2 is a block diagram of the controller shown in FIG. 1.

The controller 28 is shown in greater detail in FIG. 2. The current and voltage signals are received by the controller 28 from the current sensor 34 and the voltage sensor 36 on lines 46 and 48 respectively, as discussed above. The signals are first received by an analog-to-digital converter (ADC) 52, which converts the analog current and voltage signals to digital form and transmits them in digital form to a digital signal processor (DSP) 54 on line 56.

The DSP 54 filters extraneous noise from the current-representative and voltage-representative signals and also amplifies these signals before transmitting the filtered signals on line 60 to a neural network, or net processor, 58. The neural network 58 can be embodied as either multiple processors or as a single processor.

A neural network is a modifiably interconnected set of active, generally non-linear, elements (usually called neurons) which accept input signals from their environment and which both return to that environment some indication of their collective response to these signals and adjust the relevant characteristics of their interconnectivity in a manner which tends to increase the network's capacity for giving unique responses to stimuli with which, by training, it becomes increasingly familiar.

The neurons (or, more properly, the processing elements (PEs) or nodes) are, depending upon the specific software or hardware network implementation, mathematical or physical entities each capable of accepting an input signal (itself usually the sum of several contributions) and producing in response thereto an output signal whose value is some function of the total input signal value.

Linking the PEs to one another are the connections or weights. Again, depending upon the specific network implementation, these are either mathematical or physical entities. The weights mediate the inter-PE communication, each weight determining the signed fraction of the signal representing the output of some source PE that will be communicated to the input terminal of some target PE. It is the sum of all the signals impinging upon a PE input terminal which is employed in computing the PE output value.

Network behavior is determined principally by the distribution of PEs, the particular form of the PE interconnectivity, and the learning rule by which alterations are made to the weight values in response to presented input and (where appropriate) output signals. Of the many possible configurations of PEs and connections, variations on one of the simplest, the multi-layer, feed-forward, perceptron network, have proved to be of perhaps the greatest general utility. In this network scheme, the PEs are typically arranged In three or more layers.

The layers of a typical feed-forward network usually include one referred to as an input layer, one designated the output layer, and one or more intermediate (or hidden) layers. In such a network, connections (the weights) are entirely unidirectional and link PEs on a given layer only to PEs on the immediately superior layer. Also characteristic is the fact that each PE on any layer is connected to all PEs on the layer immediately above it (that is, each PE on some layer receives signals only from all PEs on the layer immediately below it). PEs on the uppermost layer are usually arranged to correspond (in the simplest case) one-for-one to the properties or parameters (the dependent variables) about which the network is intended to learn. PEs on the lower-most layer are taken to correspond similarly to the independent variables on the basis of which network training is expected to take place.

In a strictly feed forward network, there would be, by definition, no "reverse" connections. There may, however, be feedback connections (still unidirectional) from higher to lower layers. Networks employing these are generally called "recurrent". Such recurrent neural networks have been the most effective in controlling spot welding.

Training of a network of the perceptron variety can be effected in several ways. The most common of these (the so-called backpropagation-of-error method) involves presenting the input nodes with signals representing the values of the independent variables, the output node (or nodes) with signals representing expected values for the dependent variable(s), and, after evaluating the network response(s) to the inputs, using any resultant discrepancies between expected and realized output signals to effect modification of the strengths of network connections (or weights). The term "backpropagation-of-error" derives from the process by which these discrepancies are propagated in the reverse direction through the network, from top layer to bottom, to effect alterations of network weights of such magnitudes and signs as to reduce the discrepancies encountered during subsequent forward network operation. This process, when applied repeatedly, tends to reduce the overall error for all members of a training set. It should be appreciated that the network is not memorizing examples but developing a generalization from a relatively limited set of specific cases. In the presently preferred embodiment, the neural network 58 is programmed with a set of weights written into a very large scale integration (VLSI) application specific integrated circuit (ASIC). The weights represent the functional relationship by which the network transforms the input signals into output signals. A more complete description of neural network configurations as known to those skilled in the art is described in *Introduction to the Theory of Neural Computation*, by John Hertz et al., Lecture Notes Volume 1, Santa Fe Institute, Studies in the Sciences of Complexity, Addison-Wesley Publishing Company.

The neural network 58 receives the current and voltage data in real time, follows the status of the weld in progress and, using the programmed weights, predicts the instant at which weld expulsion will occur. The neural network 58 then transmits to a net controller 62 on line 64 a time representing a minimum time increment prior to the predicted time of weld expulsion.

If, for example, the minimum time increment is one millisecond, and the neural network 58 predicts that weld expulsion will occur at twenty-five milliseconds, then neural network 58 transmits to the net controller 62 a value of twenty-four milliseconds, indicating to the net controller 62 that the current to the welding head 26 should be stopped twenty-four milliseconds later.

The net controller 62 receives other instructions on line 66 from a host 68. The host 68 contains all of the processing parameters for the welding system and, in presently preferred embodiments, is either a card-based or single chip micro controller, or a personal computer, such as those made by IBM or Apple. The host 68 provides to the net controller 62 a minimum weld duration and a maximum weld duration, in addition to other instructions.

The minimum weld duration represents that length of time less than which the net controller 62 is prevented from instructing the power supply 30 to terminate the current to the welding head 26. If, for example, the neural network 58 passes a stop time parameter of ten milliseconds to the net controller 62, and the net controller 62 receives a minimum weld duration parameter of fifteen milliseconds from the host 68, then the net controller 62 does not instruct the power supply 30 to stop current to the welding head 26 until fifteen milliseconds have elapsed. This is intended as a safeguard to ensure that at least a minimum reasonable amount of time is given for the weld to progress and ensure that erroneously low values from the neural network 58, for example caused by faulty hardware or aberrant weld conditions, are not used to control the weld.

The maximum weld duration represents that length of time greater than which the net controller 62 is prevented from letting the power supply 30 continue to supply the current to the welding head 26. If, for example, the net processor 58 passes a stop time parameter of forty milliseconds to the net controller 62 and the net controller 62 receives a maximum weld duration parameter of thirty milliseconds from the host 68, then the net controller 62 instructs the power supply 30 to stop current to the welding head 26 after thirty milliseconds have elapsed. This is intended as a safeguard to ensure that at most a maximum reasonable amount of time is given for the weld to progress, and ensure that erroneously high values from the neural network 58, for example caused by faulty hardware or aberrant weld conditions, are not used to control the weld. Accordingly, and in any event, the controller will not respond to grossly inaccurate predictions.

At the proper time, the net controller 62 sends a signal to the welder controller 70 on line 72 to stop the weld. The welder controller 70 immediately relays a representative signal on line 74 to the digital-to-analog converter (DAC) 76, which sends another representative signal on line 44 to the power supply 30, which immediately turns off or otherwise interrupts the current to the welding head 26, completing the weld. The form and level of each signal is specific to the part of the system to which it is relevant.

The welding controller 70 can also receive additional instructions from the host 68 on line 78. These instructions include, in the presently preferred embodiment, such data as how, when, and where to reposition the welding head 26, and the clamping force to apply on the stack-up 20 between the electrodes 22. These instructions are transmitted from the welder controller 70 at the appropriate times to the DAC 76, which communicates with the welding head 26 on line 42.

The welder controller 70 also receives the digital current and voltage signals directly from the ADC 52 on line 79. If, for example, the welder controller 70 detects expulsion between the minimum and maximum weld durations, for example in accordance with techniques of the prior art explained above, the welder controller 70 immediately generates the stop current command without waiting for the net controller 62 to generate the stop current signal. This procedure reduces the time between unpredicted expulsion and terminating the current, so that the strength of the weld is not additionally reduced by the prolonged application of current.

The host 68 also controls the set-up of the ADC 52 on line 80, the DSP 54 on line 82, and the DAC on line 83. In the presently preferred embodiment, the host 68 can receive all of the set-up information on line 50 from the production control system. In alternate embodiments, the host 68 can be programmed directly with the set-up information.

The analysis function of the neural network or net processor 58 can be understood with reference to FIGS. 3A–3D and FIG. 4.

FIGS 3A–3D depict a stack-up 20 with top sheet 20a and bottom sheet 20b held between electrodes 22. An interstitial space 84 between the sheets 20a and 20b represents the gap which is always present to some degree between the surfaces of two separate bodies.

Figure 3A:
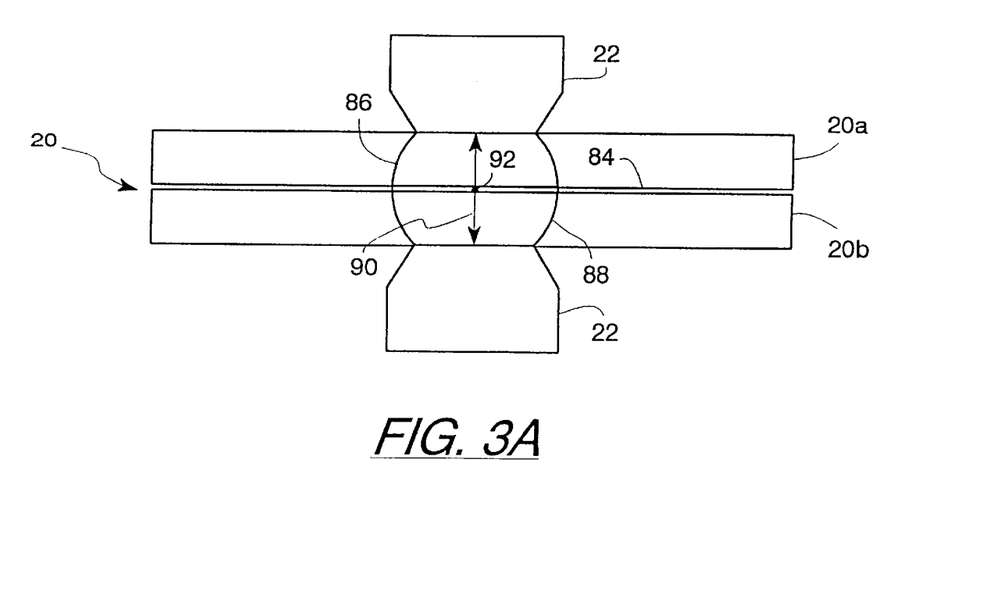
FIGS. 3A–3D depict, in cross section, the sequential stages of a typical spot weld in progress.

FIG. 3A shows arcs 86 and 88, representing generally the area of the stack-up 20 through which the alternating current passes. The highest current typically passes directly between the electrodes 22, along path 90. Due to the large current, and the resistance present at the interface of the sheets 20a and 20b, the stack-up 20 will heat at the point labeled 92 on FIG. 3A. The heating of the stack-up 20 further increases the resistance, which further increases the heating affect.

Figure 3B:
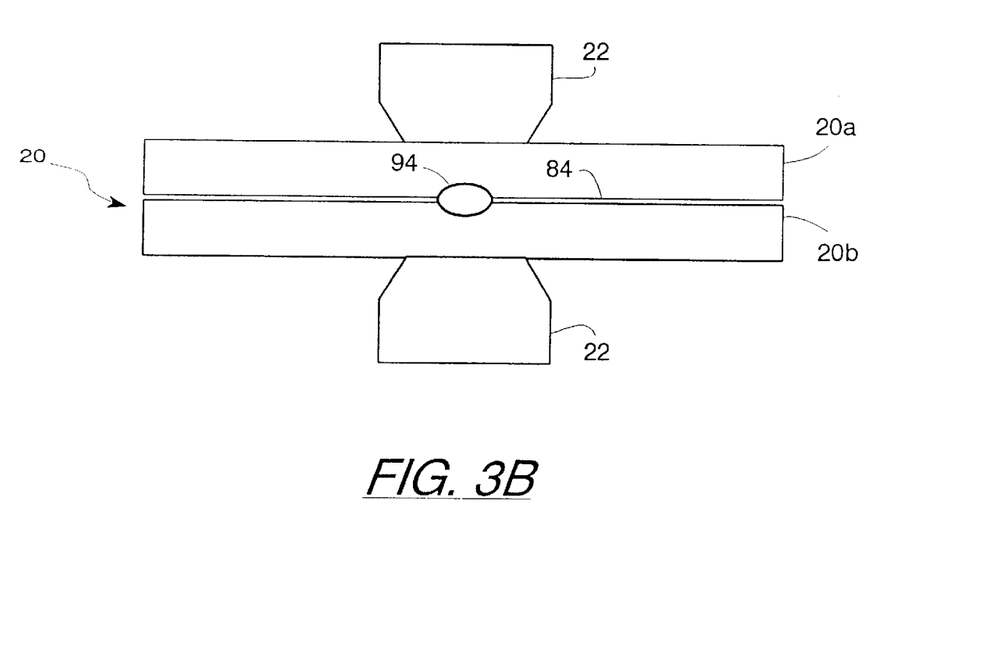
Figure 3C:
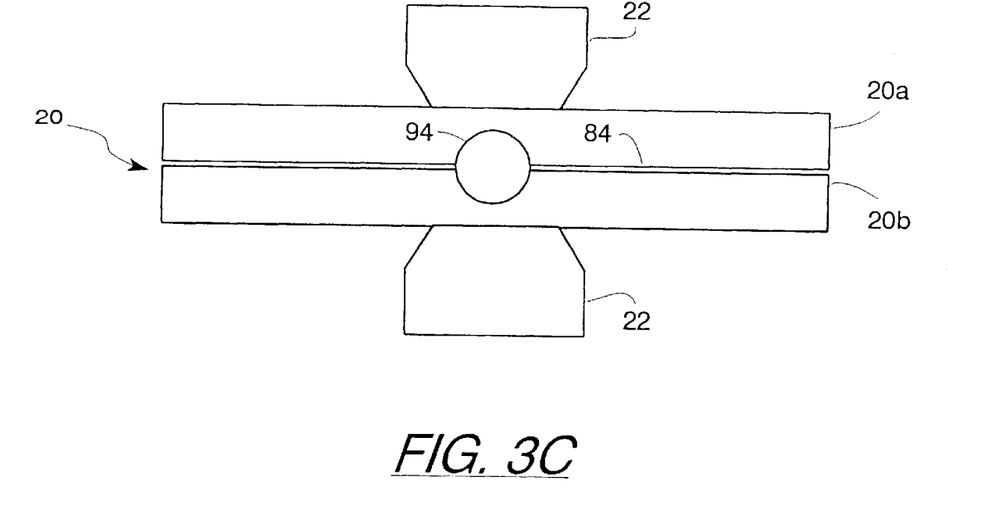
Figure 3D:
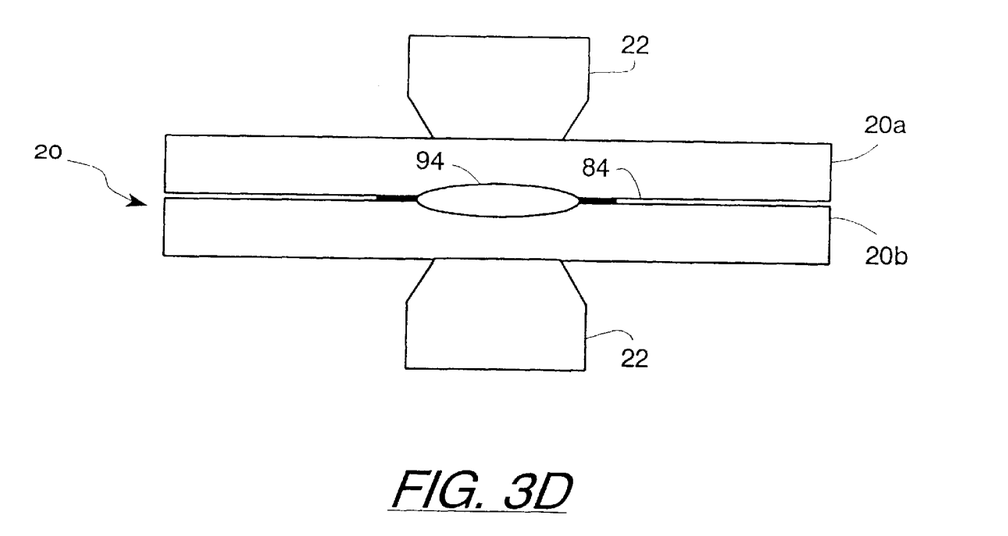

As the weld progresses, the heated sheets 20a and 20b soften and form a nugget 94 of fused, commingled material, as depicted in FIG. 3B. The nugget 94 will continue to grow, as depicted in FIG. 3C. Finally, there comes a time when the pressure of the electrodes 22 can no longer counteract the growing pressure exerted by the weld nugget 94. Under these conditions some of the liquid material of the nugget 94 flows out of the nugget site between the electrodes 24, and into the interstitial space 84 between the sheets 20a and 20b, as depicted in FIG. 3D. The instant at which the weld is the most fully developed is depicted in FIG. 3C, that is, just prior to weld expulsion.

Figure 4:
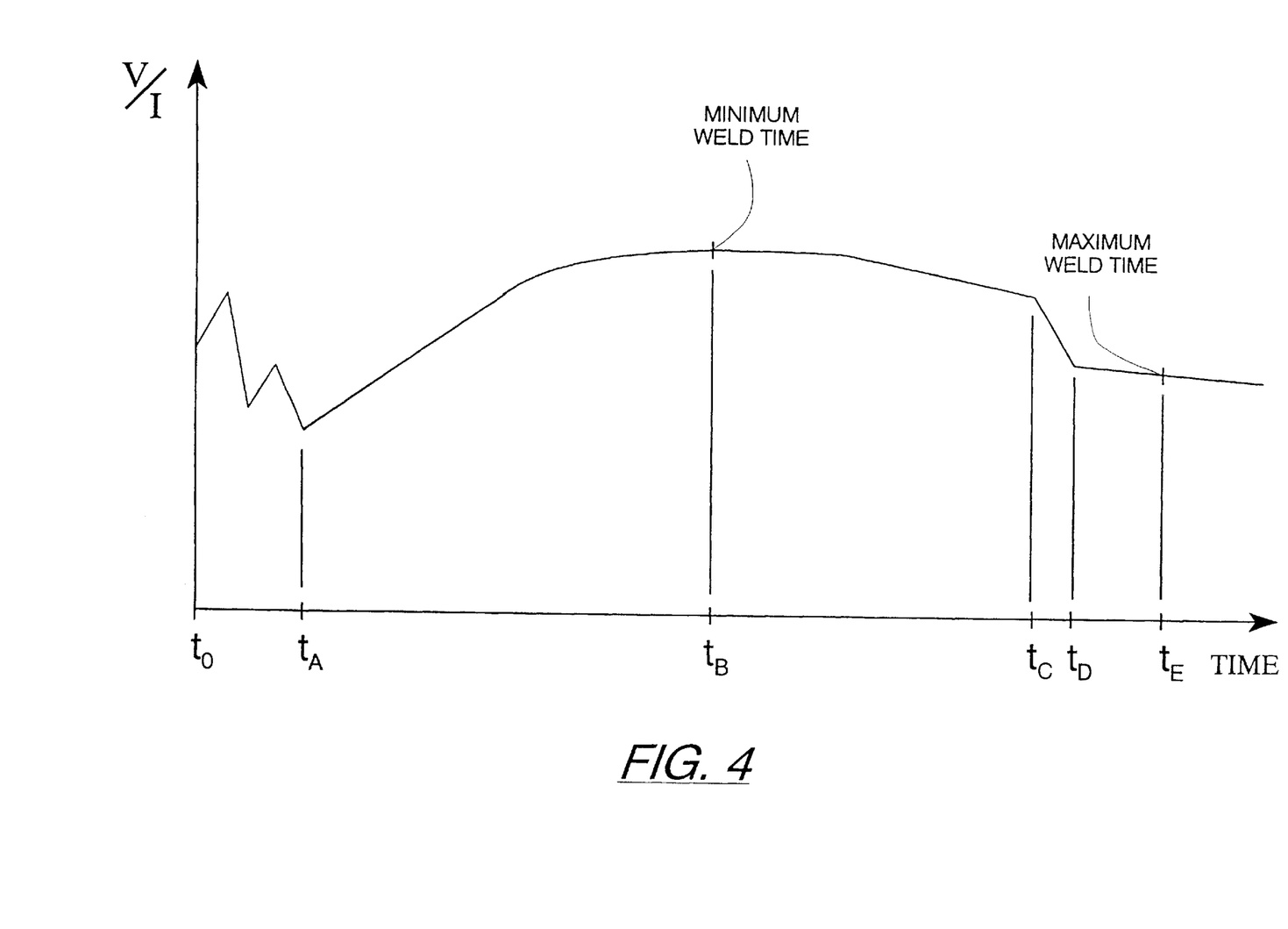
FIG. 4 is a dynamic weld resistance plot of a typical weld in progress.

A dynamic resistance plot for a typical resistance spot weld is shown in FIG. 4. On the abscissa is plotted the quotient of the voltage (V) and current (I) as measured at the weld electrode tips. This quotient represents a computed resistance value in accordance with Ohm's Law. On the mantissa are plotted times at which values of the current and voltage data are sampled.

At the beginning of the weld, between time $t_0$ and time $t_A$, the resistance behavior of the system can be quite erratic. Nevertheless, it is believed that even this erratic behavior can hold information which is useful to the neural network. In any event, this first time interval represents a settling time during which contaminants, surface cladding, and oxides are burned through, and other irregularities in the physical system settle down. After settling down, the initial resistance of the stack-up 20 is relatively low, as shown at time $t_A$ on the curve. The resistance gradually rises as the temperature of the stack-up 20 increases, reaching a maximum resistance at time $t_B$. This section of the curve generally represents the conditions as depicted in FIG. 3A.

When the stack-up 20 fuses and forms a nugget 94, namely after time $t_B$, the decreased contact resistance between the sheets 20a and 20b results in a decrease in resistance. The section of the curve at time $t_B$ generally represents the conditions as depicted in FIG. 3B. The resistance continues to decrease gradually as the nugget 94 grows in size and provides a larger current path. The section of the curve at time $t_C$ generally represents the conditions as depicted in FIG. 3C.

When weld expulsion starts at time $t_C$, the resistance typically drops appreciably, due to the larger conductive area provided by the molten material spreading into the interstitial space 84. The section of the curve at time $t_D$ generally represents the conditions as depicted in FIG. 3D, just after expulsion has occurred. The optimum result obtains the current to the stack-up 20 is stopped at a point as close to time $t_C$ as possible, without exceeding time $t_C$ and proceeding into expulsion.

By tracking the initial current and voltage representative data provided by the current sensor 34 and the voltage sensor 36 during weld progress, the neural network 58 is able predict the most probable future current and voltage behavior of the weld in progress. Thus, the neural network 58 predicts the moment of occurrence of the optimal weld, nominally at time $t_C$ on the curve and, at a time prior to this occurrence, transmits information to the net controller 62 which initiates procedures to terminate the current at the predicted time.

This is markedly different from those employed by traditional control processors, which apply a predetermined weld time.

With each weld event that is processed by the neural network 58, the weights which are used to predict the optimal weld can advantageously be adjusted and refined, thus causing the prediction of expulsion to be more and more precise as the welder operates. The times for minimum and maximum weld duration, as discussed above, are also depicted on the curve in FIG. 4, at times $t_B$ and $t_E$ respectively. The range of times between $t_B$ and $t_E$ represents the range of predicted times to which the controller can safely respond.

Figure 5:
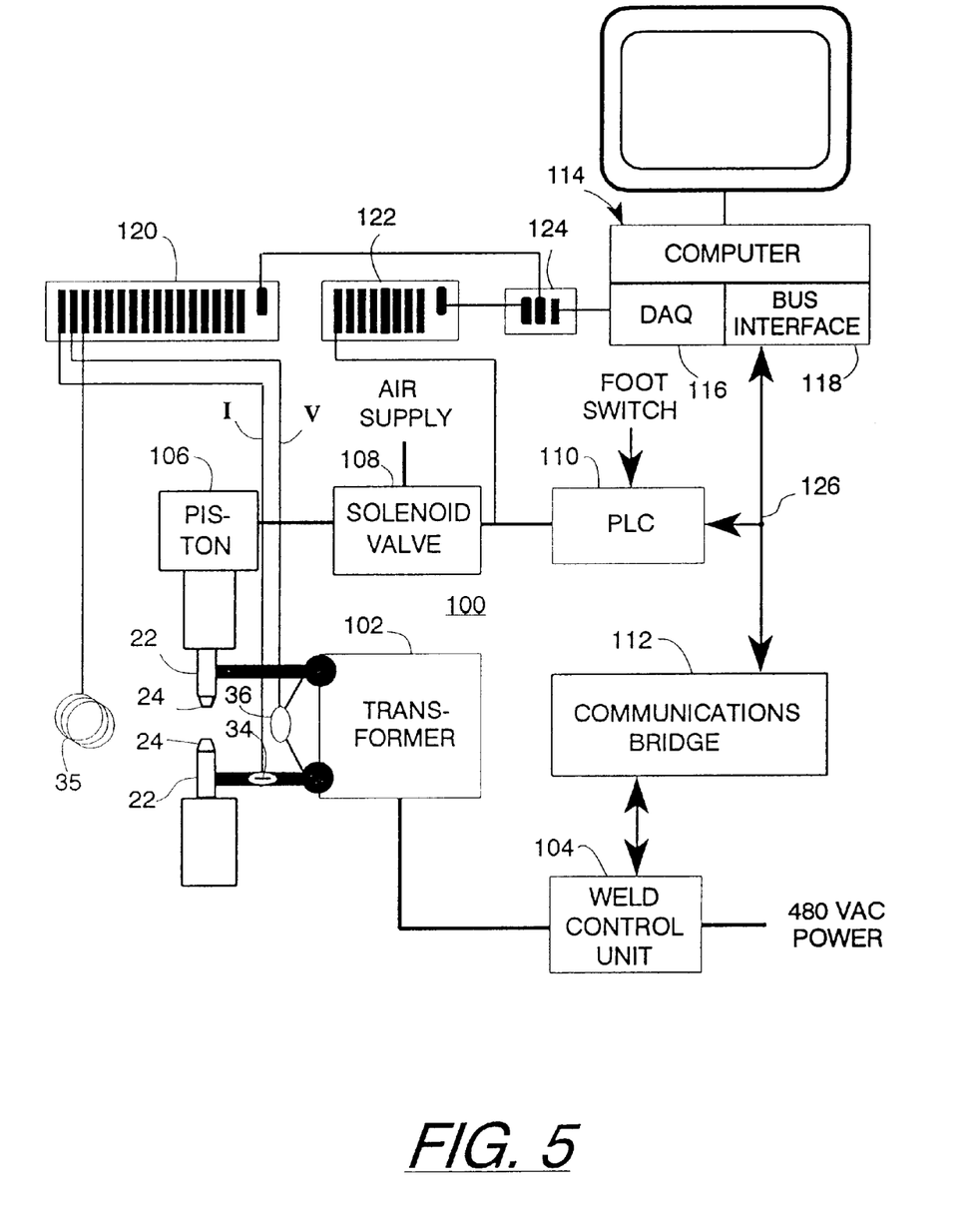
FIG. 5 is a block diagram of an alternative embodiment of a spot welder controlled by a neural network, in accordance with the inventive arrangements.

A further embodiment of a spot welder in accordance with the inventive arrangements is illustrated in block diagram form in FIG. 5. In this embodiment, a sense coil generates a bucking EMF signal by which to cancel a large fraction of the induced EMF in the signal that would represent the voltage appearing directly at the welding transformer secondary, rather than at points nearer the welding electrodes themselves. Proper choice of sense coil position and orientation can be employed to force a combination of signals whose net characteristics track very closely the characteristics of the parameter which is the best basis for predicting weld strength, but which cannot be measured directly, namely the dynamic weld resistance.

With reference to FIG. 5, a spot welder 100 comprises a weld control unit 104 which receives input power, for example 480 VAC, and a transformer 102 coupled to the weld control unit 104 for energizing the electrodes 22 and electrode tips 24. The welding tips are moved toward one another by one or more pistons 106, one of which is shown in the drawing. The piston 106 is activated by pneumatic pressure from an air supply, controlled by a solenoid valve 108. The solenoid valve can be manually activated by an operator, for example using a foot switch, coupled to the solenoid valve 108 through a programmable logic controller (PLC) 110. A neural network is implemented in a computer 114, for example a personal computer, having a data acquisition circuit (DAQ) 116 and a bus interface 118. The bus interface 118 communicates with the PLC 110 and a communications bridge 112 over a bus 126. The communications bridge is also coupled to the weld control unit 104.

An analog signal conditioning circuit 120 receives inputs from a current sensor 34, illustrated as a buried current shunt, a voltage sensor 36 and a sense or bucking coil 35. Circuit 120 can provide signal scaling and buffering. The sense coil 35 generates a bucking EMF signal by which substantially to cancel the induced EMF components in the signal from the voltage sensor 36, which monitors voltage at the secondary of the transformer 102. EMF components can also be canceled from the signal from the current sensor 34, although use of the buried shunt generally makes this unnecessary. It has been found that the use of a sense coil can result in cancellation of as much as 99%, or more, of the EMF distortion. It is believed that cancellation of at least approximately 90% of the EMF distortion must be achieved in accordance with this aspect of the invention, in terms of the capabilities of presently available neural networks. Accordingly, substantial cancellation of EMF variation or distortion is deemed herein to be cancellation of at least approximately 90% of such EMF variation or distortion.

The input signals representative of the voltage and current, as corrected for the EMF effects, and the output control signal for terminating the weld in progress are further scaled and buffered in digital input/output conditioning circuits 122 and 124. The DAQ 116 is responsible for analog to digital conversions of the input signals for the neural network and the digital to analog conversion of the output control signal for terminating the weld in progress. The output signal can deactivate the solenoid valve 108 and terminate the current to stop the weld in progress at the instant predicted by the neural network in the computer 114.

The sense coil can also be utilized in the embodiment shown in FIGS. 1 and 2. It should be appreciated that the particular arrangement of blocks into which the spot welder and control circuit are divided in the different figures and illustrated embodiments is somewhat arbitrary, and that a particular division reflects convenience for illustrating different aspects of the inventive arrangements.

The inventive arrangements can be embodied in other specific forms without departing from the spirit or essential attributes thereof, and accordingly reference should be made to the appended claims, rather than the foregoing specification, as indicating the scope of the inventive arrangements.

What is claimed is:

1. A spot welder, comprising:
    at least two electrodes having tips engageable with a stack-up of material;
    a power supply for energizing said electrodes to spot weld said stack-up when said electrodes are engaged with said stack-up;
    a current sensor coupled to said power supply and generating a first signal representative of current supplied to said electrodes;
    a voltage sensor coupled to said power supply and generating a second signal representative of voltage across said electrodes and said stack-up;
    a neural network for processing, in real time, data representative of said first and second signals for a weld in progress according to a learning rule determined by data from previous welds, said neural network generating a predicted time of optimal weld strength for said weld in progress; and,
    a controller responsive to said neural network for terminating said weld in progress responsive to said predicted optimal time.

2. The spot welder of claim 1, further comprising a third sensor for detecting electromotive forces (EMF) induced by said spot welder and generating a third signal for substantially canceling out EMF components in at least one of said first and second signals.

3. The spot welder of claim 2, wherein:
    said current sensor comprises a buried shunt, substantially precluding said EMF components in said first signal; and,
    said third signal cancels out said EMF components in said second signal.

4. The spot welder of claim 3, further wherein said host receives said set-up instructions from a production control system.

5. The spot welder of claim 1, wherein said learning rule is updated by said data representative of said first and second signals from successive welds.

6. The spot welder of claim 1 further comprising a robot arm for positioning said electrodes responsive to said controller.

7. The spot welder of claim 1, wherein said controller further comprises:
    an analog to digital converter (ADC) for said current and voltage signals;
    a digital signal processor (DSP) for filtering and amplifying digital signals from said ADC for use by said neural network;
    a neural network controller for generating a stop current signal at said predicted time of optimal weld strength;
    a welder controller responsive to said stop current signal for generating a digital stop current command; and,
    a digital to analog converter (DAC) responsive to said digital stop current command for supplying an analog stop current command to said power supply.

8. The spot welder of claim 7, wherein the controller further comprises a host for providing set-up instructions to said ADC, said DSP, said neural network controller, said welder controller, and said DAC.

9. The spot welder of claim 1 wherein said controller is programmed with a minimum weld time and a maximum weld time, said minimum weld time representing a minimum length of time before said controller terminates said weld in progress, and said maximum weld time representing a maximum length of time before said controller terminates said weld, said controller being responsive to said predicted time of optimal weld strength only between said minimum and maximum weld times.

10. An improved controller for a spot welder having current and voltage sensors for generating respective signals representative of current and voltage levels during a spot weld in progress, the improvement comprising:
    a neural network for processing, in real time, data representative of said respective signals for said spot weld in progress according to a learning rule determined by data from previous welds, said neural network generating a predicted time of optimal weld strength for said weld in progress; and,
    a controller responsive to said neural network for terminating said weld in progress responsive to said predicted time of optimal strength.

11. The improved controller of claim 10, further comprising a further sensor for electromotive forces (EMF) induced by said spot welder and generating a further signal for substantially canceling out EMF components in at least one of said respective signals.

12. The improved controller of claim 11, wherein:
    said current sensor comprises a buried shunt, substantially precluding said EMF components in said first signal; and,
    said further signal cancels out said EMF components in said signal representative of voltage.

13. The improved spot welder controller of claim 11, wherein said controller is programmed with a minimum weld time and a maximum weld time, said minimum weld time representing a minimum length of time before said controller terminates said weld in progress, and said maximum weld time representing a maximum length of time before said controller terminates said weld, said neural network controller being responsive to said predicted time of optimal weld strength only between said minimum and maximum weld times.

14. The improved spot welder controller of claim 10, wherein said controller is programmed with a minimum weld time and a maximum weld time, said minimum weld time representing a minimum length of time before said controller terminates said weld in progress, and said maximum weld time representing a maximum length of time before said controller terminates said weld, said neural network controller being responsive to said predicted time of optimal weld strength only between said minimum and maximum weld times.

15. The improved spot welder controller of claim 10, wherein said learning rule is updated by said data representative of said first and second signals from successive welds.

16. A method for controlling a spot welder, comprising the steps of:
    sensing in real time current and voltage levels energizing a spot weld in progress;
    predicting a time of optimal weld strength with a neural network responsive to said sensed current and voltage levels according to a learning rule determined by data from previous welds; and, terminating said weld in progress responsive to said predicted time of optimal weld strength.

17. The method of claim 16, further comprising the steps of:

sensing in real time electromotive forces (EMF) induced by said spot welder; and, substantially canceling out EMF components in at least one of said sensed current and voltage levels in accordance with said sensed EMF prior to processing of said current and voltage levels by said neural network.

18. The method of claim 17, further comprising the steps of:

sensing said current with a buried shunt, substantially precluding said EMF components in said first signal; and, substantially canceling out said EMF components in said second signal.

19. The method of claim 17, further comprising the steps of:

preventing termination of said weld in progress responsive to said predicted time when said predicted time is prior to a predetermined minimum weld duration; and, terminating said weld in progress after a predetermined maximum weld duration when said predicted time is after said predetermined maximum weld duration.

20. The method of claim 16, further comprising the steps of:

preventing termination of said weld in progress responsive to said predicted time when said predicted time is prior to a predetermined minimum weld duration; and, terminating said weld in progress after a predetermined maximum weld duration when said predicted time is after said predetermined maximum weld duration.

21. A spot welder, comprising:

at least two electrodes having tips engageable with a stack-up of material;

a power supply for energizing said electrodes to spot weld said stack-up when said electrodes are engaged with said stack-up;

a current sensor coupled to said power supply and generating a first signal representative of current supplied to said electrodes;

a voltage sensor coupled to said power supply and generating a second signal representative of voltage across said electrodes and said stack-up;

a neural network for processing, in real time, data representative of said first and second signals for a weld in progress according to a learning rule determined by data from previous welds, said neural network generating a predicted time of optimal nugget size for said weld in progress; and, a controller responsive to said neural network for terminating said weld in progress responsive to said predicted time of optimal nugget size.

22. A method for controlling a spot welder, comprising the steps of:

sensing in real time current and voltage levels energizing a spot weld in progress;

predicting a time of optimal weld strength with a neural network responsive to said sensed current and voltage levels according to a learning rule determined by data from previous welds; and, terminating said weld in progress responsive to said predicted time of optimal nugget size.

* * * * *